(12) United States Patent
Freer, II et al.

(10) Patent No.: US 8,491,055 B2
(45) Date of Patent: Jul. 23, 2013

(54) CYCLE ARMREST

(75) Inventors: William Freer, II, Albuquerque, NM (US); Mary Martin, Albuquerque, NM (US)

(73) Assignee: Enchantment Motor Sports, LLC, Albuquerque, NM (US)

( * ) Notice: Subject to any disclaimer, the term of this patent is extended or adjusted under 35 U.S.C. 154(b) by 104 days.

(21) Appl. No.: 12/895,744

(22) Filed: Sep. 30, 2010

(65) Prior Publication Data

US 2011/0074188 A1    Mar. 31, 2011

Related U.S. Application Data

(60) Provisional application No. 61/247,496, filed on Sep. 30, 2009.

(51) Int. Cl.
*A47C 7/54* (2006.01)
(52) U.S. Cl.
USPC ............. 297/411.25; 297/411.31; 297/411.37
(58) Field of Classification Search
USPC .......................... 297/411.25, 411.37, 411.31
See application file for complete search history.

(56) References Cited

U.S. PATENT DOCUMENTS

| 585,913 | A | | 7/1897 | Haynes |
| 3,612,606 | A | * | 10/1971 | Swenson ............... 297/411.31 X |
| 3,901,534 | A | | 8/1975 | Popken |
| D246,968 | S | | 1/1978 | Sklodowsky |
| 4,225,183 | A | | 9/1980 | Hannagan et al. |
| 4,549,629 | A | | 10/1985 | Komuro |
| 4,695,096 | A | | 9/1987 | Kincaid |
| 5,547,253 | A | | 8/1996 | Schwartz et al. |
| D373,344 | S | | 9/1996 | Wissen |
| 5,765,919 | A | | 6/1998 | Karlsson et al. |
| 6,164,725 | A | | 12/2000 | Santa Cruz et al. |
| 6,976,552 | B1 | | 12/2005 | Kicker |
| D526,952 | S | | 8/2006 | Stahel et al. |
| 7,111,903 | B1 | | 9/2006 | Snelson |
| 7,114,774 | B2 | | 10/2006 | Stahel et al. |
| D555,047 | S | | 11/2007 | Colbert et al. |
| 7,357,456 | B1 | | 4/2008 | Freer et al. |
| D627,267 | S | | 11/2010 | Freer et al. |
| D627,268 | S | | 11/2010 | Freer et al. |

OTHER PUBLICATIONS

A&S BMW Motorcycles, "BMW Motorcycle Shopping Superstore", http://www.ascycles.com/detail.aspx?ID 2001-2009.
Bigbikethings.com, "Standard and Tourer Valkyrie Flip Up Armrest", http://www.bigbikethings.com/armrests.html Sep. 30, 2001.
Bigbikethings.com, "Top Quality Accessories", http://www.bigbikethings.com/armrests2.html Jan. 5, 2004.
Ultimate Seats CA, "VTX Seats—Passenger Armrests", http://ultimateseats.ca/vtxarmrest.html 2003-2009.

* cited by examiner

*Primary Examiner* — Anthony D Barfield
(74) *Attorney, Agent, or Firm* — Justin R. Jackson; Deborah A. Peacock; Peacock Myers, P.C.

(57) ABSTRACT

An armrest for a motorcycle passenger, which permits one or both armrests to swing out to a side thereby accommodating a boarding passenger. Optionally, the armrests can be pivoted to rearward-facing orientation in order to form a rack behind a sissy bar of a motorcycle.

16 Claims, 25 Drawing Sheets

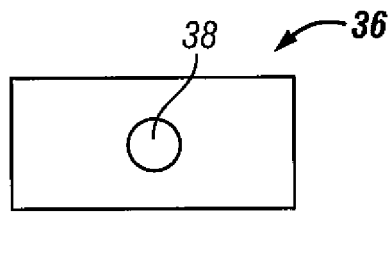
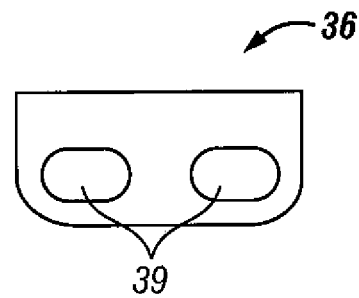
FIG. 7A
FIG. 7B
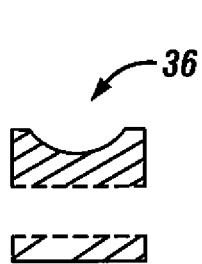
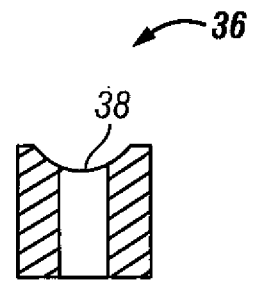
FIG. 7C
FIG. 7D

CYCLE ARMREST

CROSS-REFERENCE TO RELATED APPLICATIONS

This application claims priority to and the benefit of the filing of U.S. Provisional Patent Application Ser. No. 61/247,496, entitled "Motorcycle Armrest", filed on Sep. 30, 2009, and the specification thereof is incorporated herein by reference.

BACKGROUND OF THE INVENTION

1. Field of the Invention (Technical Field)

Embodiments of the present invention relate to a cycle armrest, and more particularly to a motorcycle passenger armrest which can be attached to a sissy bar of a cycle and which armrests can swing outward to accommodate the mounting of passenger onto the cycle. A padded backrest can also optionally be incorporated into an embodiment of the present invention.

2. Description of Related Art

Note that the following discussion refers to a publication that due to recent publication date is possibly not to be considered as prior art vis-a-vis the present invention. Discussion of such publication herein is given for more complete background and is not to be construed as an admission that such publication is prior art for patentability determination purposes.

U.S. Pat. No. 7,357,456, issued Apr. 15, 2009, entitled "Motorcycle Passenger Seat Adjustable Armrest" to Freer et al., describes a backrest and armrest that flips upward to accommodate a mounting passenger. Because the prior art armrests flip upward and not outward to accommodate the mounting of a passenger onto the motorcycle, the passenger is forced to keep the armrests directed straight forward for the duration of a motorcycle ride. While forward-facing armrests provide some desirable results, the use of such armrests makes it more difficult for passengers to exit a motorcycle because her or she must lift the armrests and rotate them behind their back. There is thus a present need for an armrest which offers an easier exiting strategy for a passenger of a motorcycle.

BRIEF SUMMARY OF EMBODIMENTS OF THE PRESENT INVENTION

An embodiment of the present invention preferably relates to an apparatus having a cycle attachment mechanism and at least one armrest, the armrest pivotable outwardly to a side. The armrest can be pivotable in a substantially horizontal plane and not in a substantially vertical plane. The apparatus can include first and second armrests and each of the first and second armrests can pivot outwardly to a side. The first armrest can pivot independently of the second armrest. Optionally, only one of armrests can be configured to pivot. The attachment mechanism can include a sissy bar clamp.

In one embodiment, the apparatus can include a first armrest pivot mechanism, a second pivot mechanism, and/or a cross tube having first and second ends. In one embodiment, the first pivot mechanism can be disposed near the first end of the cross tube. The first pivot mechanism can be disposed near a first end of a cross tube and a second pivot mechanism is disposed near a second end of the cross tube. The apparatus can include a device which urges at least one of the armrests to remain in a predetermined orientation. Optionally, a cup holder can be disposed on at least one of the armrests and the cup holder can optionally be moveably positionable with respect to the armrest on which it is attached. The apparatus can include a sissy bar extension. The apparatus can be attached to a motorcycle.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIGS. 7A-D are drawings which illustrate different views of a saddle block that the cross tube of FIG. 4 rests on;

FIGS. 24A-D are respectively bottom, left side, top and front views of a sissy bar extension bracket according to an embodiment of the present invention, the right side view is simply a mirror image of the left side view and the back view is simply a mirror image of the front view.

DETAILED DESCRIPTION OF THE INVENTION

An embodiment of the present invention relates to side-swinging armrests which can optionally be attached to a sissy bar of a cycle or motorcycle, thereby providing a passenger with a backrest and armrests which can swing outward, i.e. out to one or more sides, instead of up and down, to accommodate the mounting of the passenger onto the motorcycle.

Figure 1A:
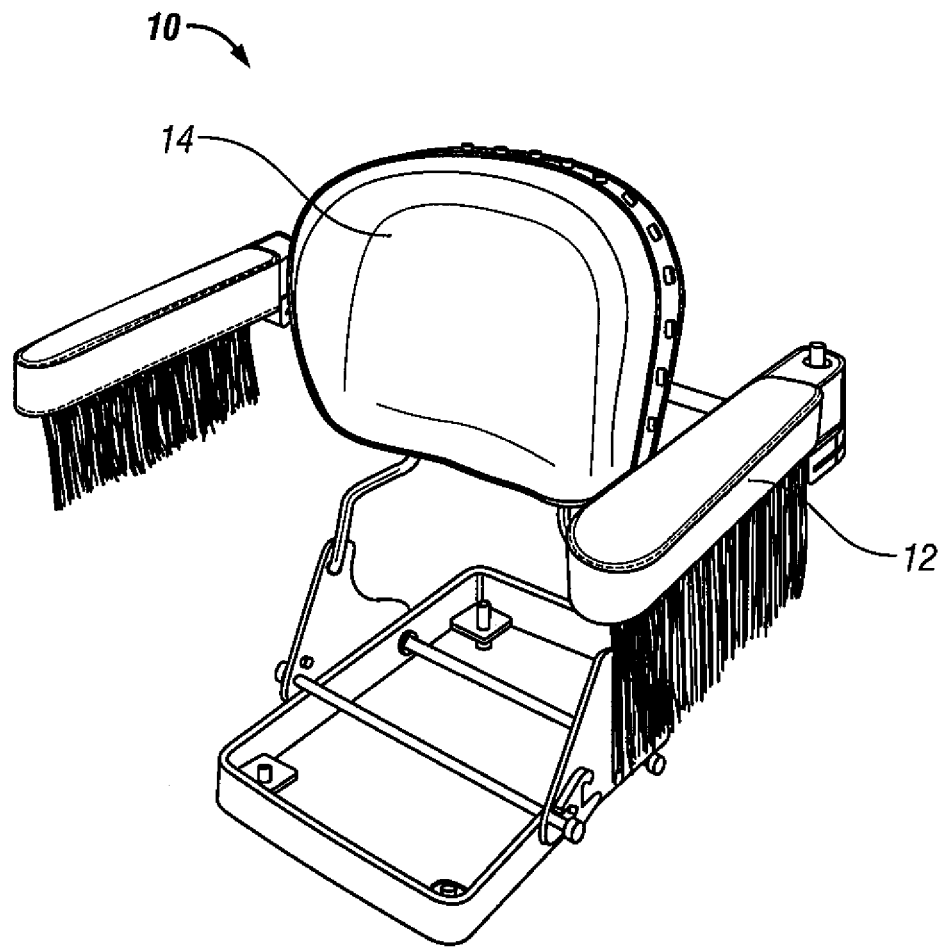
FIGS. 1A and B are drawings which illustrate an assembled back and armrest embodiment of the present invention wherein the armrests are respectively illustrated in a forward facing and rearward facing configuration.
Figure 1B:
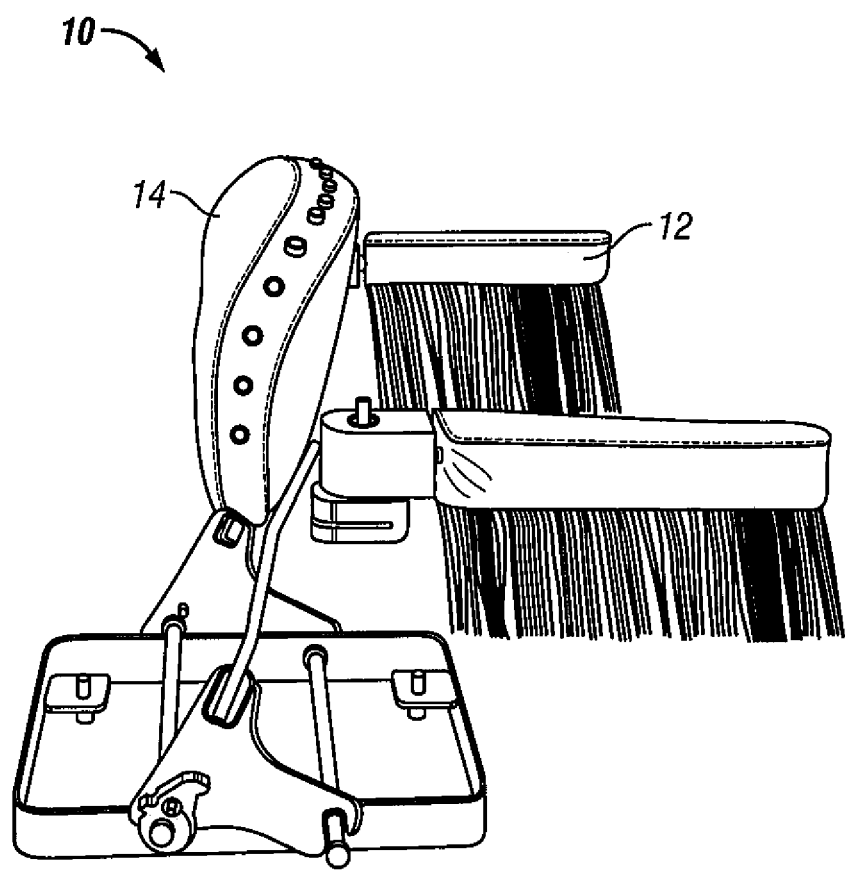

FIGS. 1A and B are drawings illustrating an embodiment of the present invention wherein armrest assembly 10 is attached to a sissy bar. FIG. 1A illustrates armrests 12 in forward-facing position wherein a motorcycle passenger can rest his or her arms on them while facing forward. FIG. 1B illustrates armrests 12 in a rear-facing position, thereby providing a rack behind a passenger on a motorcycle, which rack can be used to transport cargo. Armrest assembly 10 preferably comprises a pair of armrests 12. In an alternative embodiment, backrest 14 is optionally provided.

Figure 2:
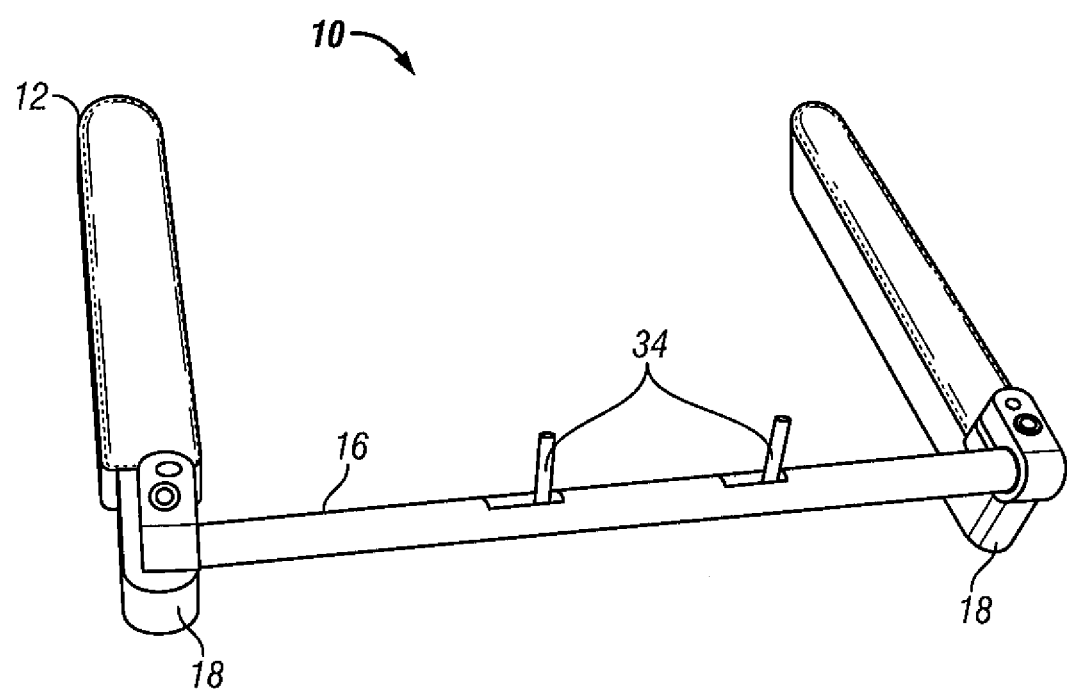
FIG. 2 is a drawing illustrating an inverted assembly of armrests connected with a cross tube.
Figure 3:
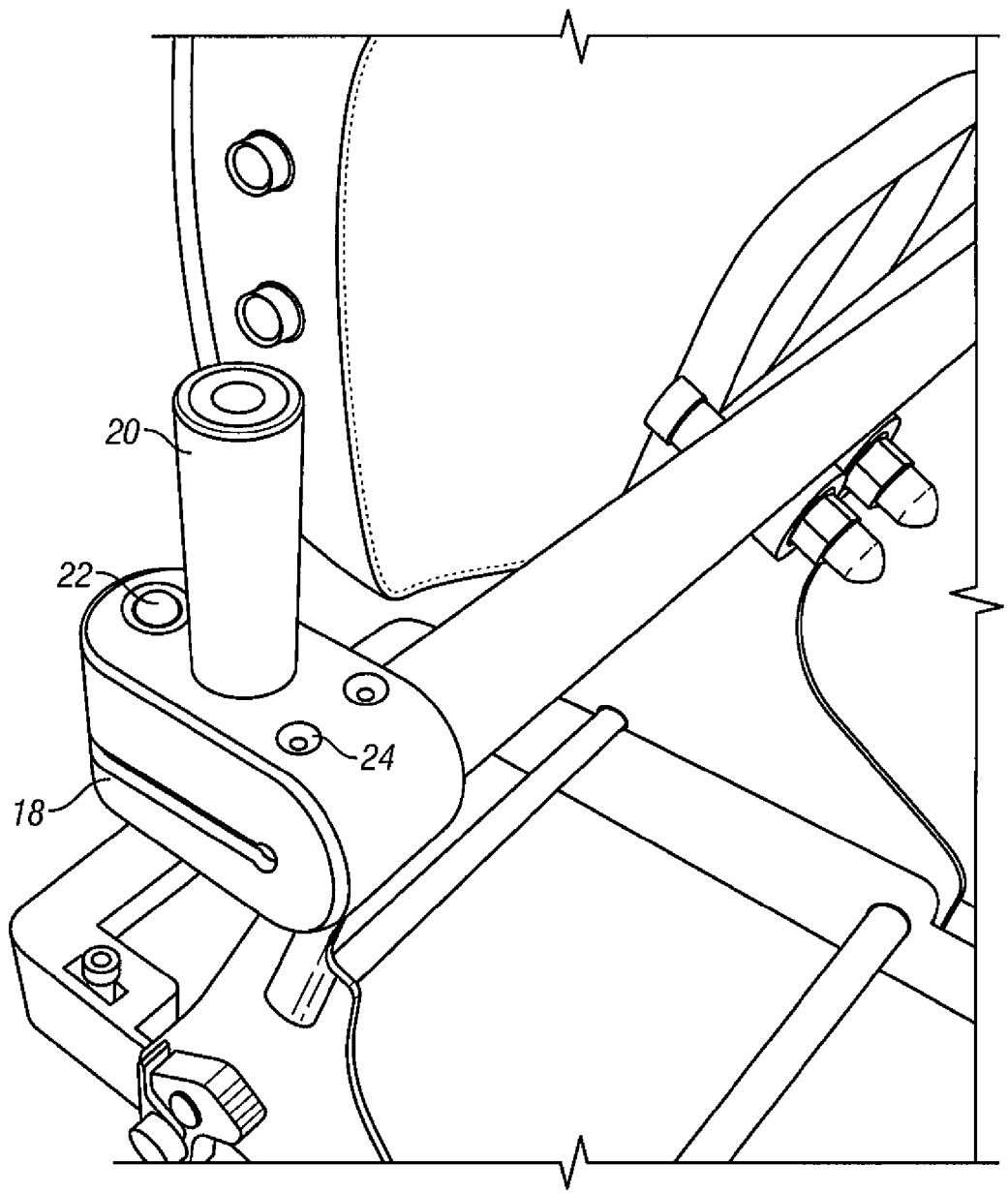
FIG. 3 is a drawing illustrating a close-up detail of a pivot carrier connected to a cross tube according to an embodiment of the present invention.

Referring now to FIGS. 2 and 3, armrests 12 preferably attach to cross tube 16 via pivot carrier 18 which preferably comprises pivot shaft 20 about which arms 12 preferably rotate. A small portion of ball 22, which is most preferably made from a hard material, such as a metal, is preferably forced to partially protrude from pivot carrier 18 under spring tension, thereby enabling ball 22 to frictionally mate with a small detent formed into mating portion on armrest 12. This arrangement permits a user to cause armrests 12 to rotate into forward-facing and/or rearward-facing positions, which can be overcome by a user applying sufficient rotational force to the armrests 12 about pivot shaft 20.

Figure 4:
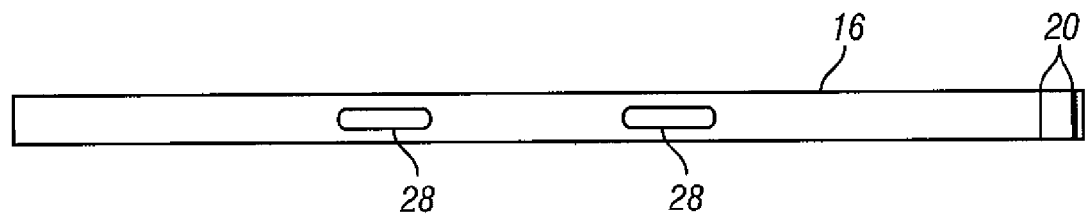
FIG. 4 is a drawing which illustrates a detail of the end of the cross tube of the present invention.

Pivot carrier 18 also preferably comprises one or more set screws 24 which are arranged to intercept grooves 20 (See FIG. 4) formed in cross tube 16. Cross tube 16 can optionally be provided in multiple lengths to accommodate passengers of various sizes.

In a preferred embodiment, cross tube 16 comprises slots 28 in addition to grooves 20. Of course multiple other manners of attachment of pivot carrier 18 onto cross tube 16 can be provided and provide desirable results including but not limited to splined or toothed fittings, or a non-tilt-adjustable fitting, such as by welding, bolting, screwing, gluing riveting, and the like. Cross tube 16 preferably attaches to a sissy bar, such that the sissy bar serves as an anchor point or support for cross tube 16. The shape and dimensions of slots 28 allow for varying widths of sissy bars.

Figure 5:
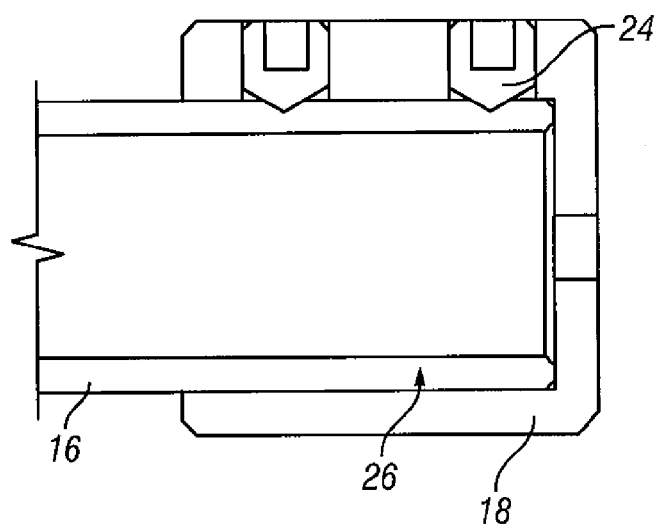
FIG. 5 is a cut-away drawing which illustrates an end of a cross tube received within a pivot carrier.

FIG. 5 illustrates an enlarged view of one end of cross tube 16 with pivot carrier 18 installed thereon. As can be seen, set screws 24 are threaded into pivot carrier 18. The tips of set screws 24 fit into grooves 20 and detachably secure pivot carrier 18 to cross tube 16. Although only a close-up drawing of only one end of cross tube 16 is illustrated as being inserted into pivot carrier 18 left and right-hand pivot carriers 18 and armrests 12 are of course preferably provided.

Figure 6A:
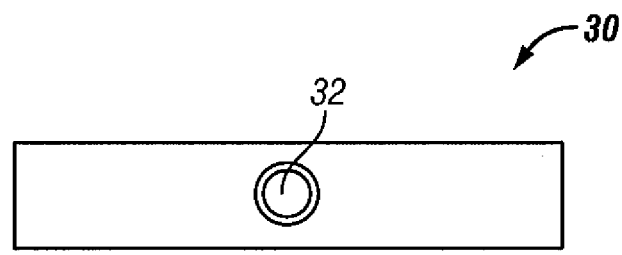
FIGS. 6A and B are drawings which respectively illustrate top and side views of a cross tube slide rod.
Figure 6B:
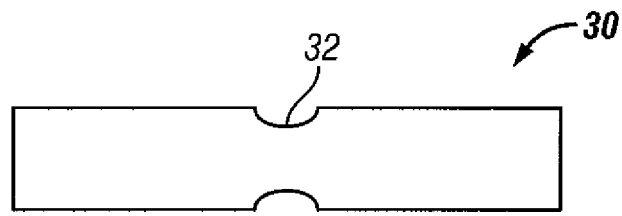
Figure 8A:
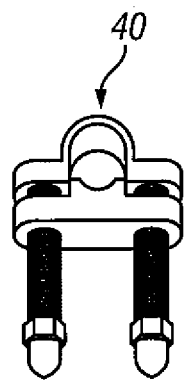
FIGS. 8A-D are drawings which illustrate multiple embodiments of sissy bar clamp and saddle block configurations.
Figure 8B:
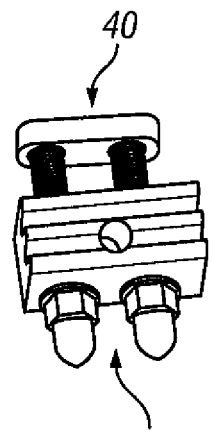
Figure 8C:
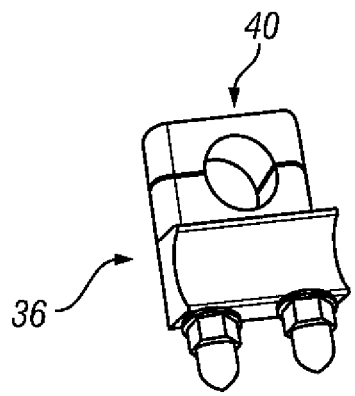
Figure 8D:
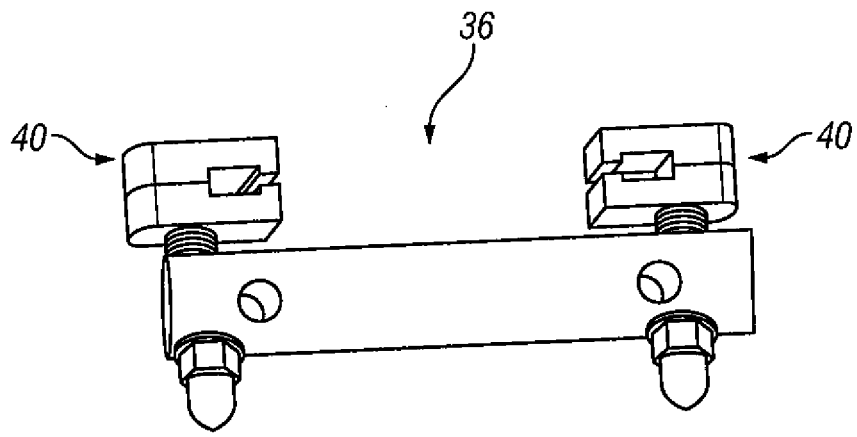
Figure 9A:
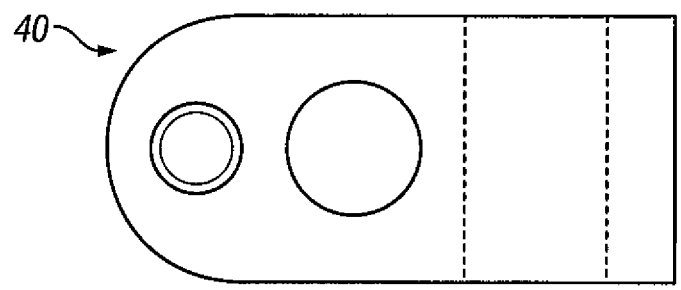
FIGS. 9A-11C illustrate multiple embodiments of sissy bar clamps according to embodiments of the present invention.
Figure 9B:
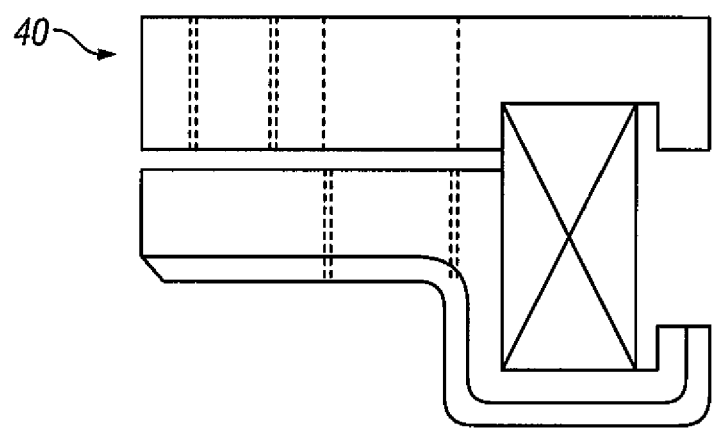
Figure 9C:
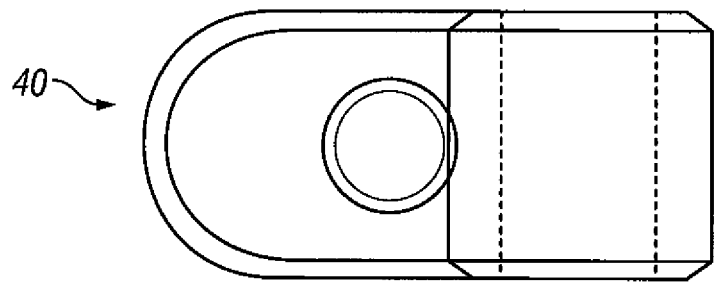
Figure 10A:
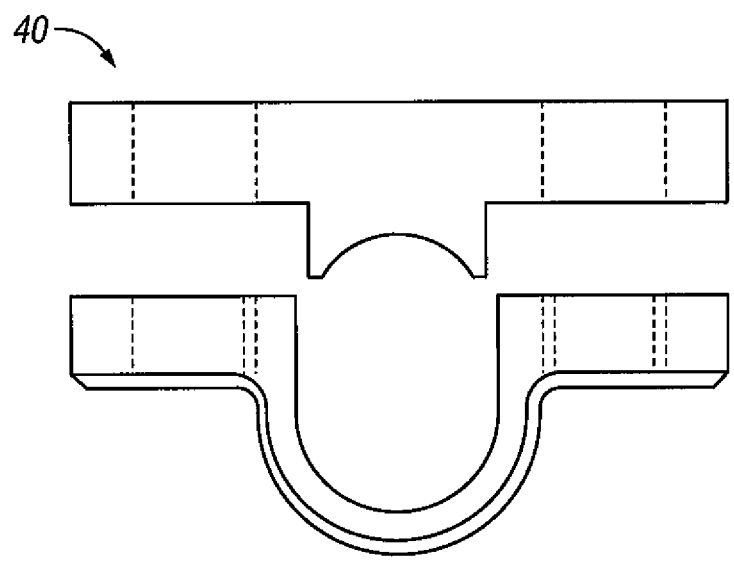
Figure 10B:
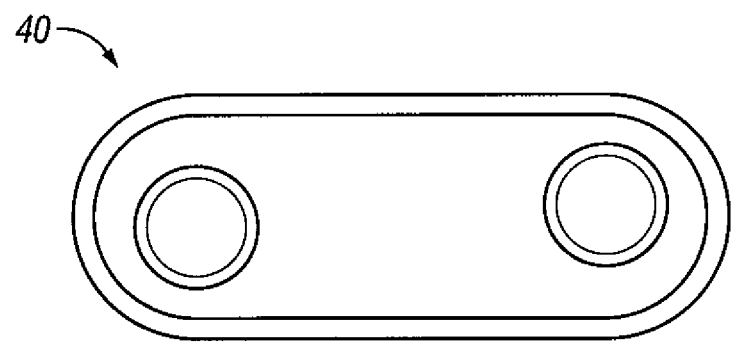
Figure 11A:
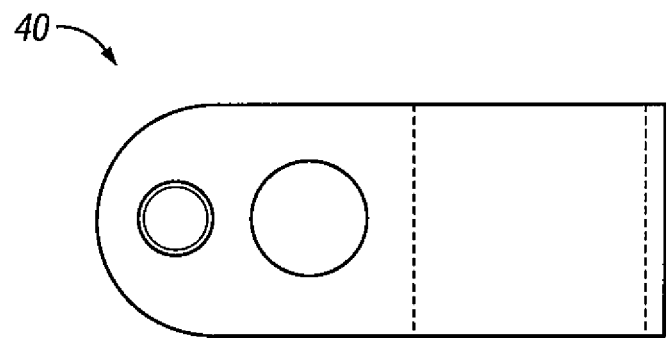
Figure 11B:
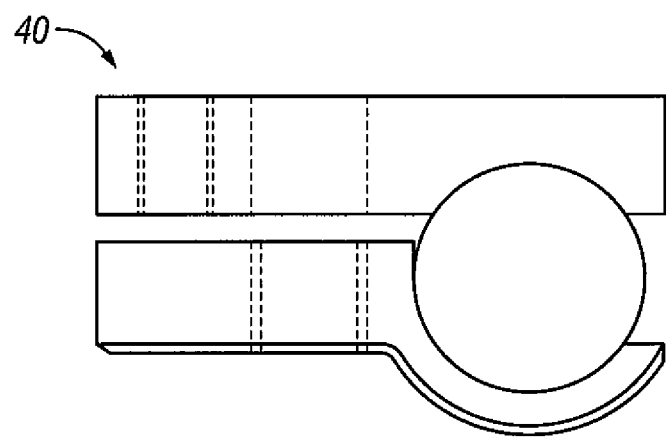
Figure 11C:
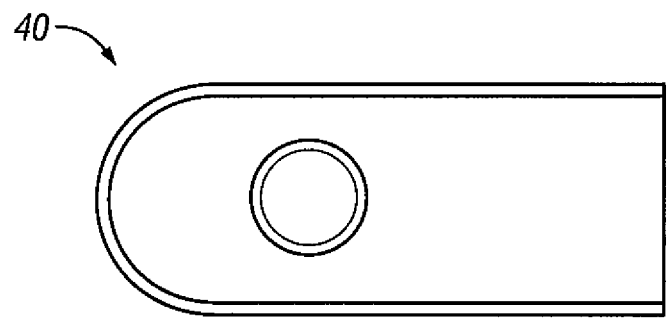

As illustrated in FIGS. 6A and B, for attachment of cross tube 16 to a sissy bar according to an embodiment of the present invention, two cross tube slide rods 30 are preferably inserted into cross tube 16 and brought into position with slots 28 in cross tube 16. FIGS. 6A and B respectively illustrate top and side views of slide rod 30. An end view would simply be a circle. Threaded rods 34 (see FIG. 2) are then preferably screwed into opening 32 of each slide rod 30. Threaded rods 34 are preferably horizontally adjustable due to slide rods 30 which can preferably slide left and right within cross tube 16 to accommodate varying sissy bar widths. Threaded rods 34 permit attachment of slide rods 30, and thus cross tube 16 and everything attached thereto, to saddle block 36 (see FIGS. 7A-7D), which has preferably already been attached to a sissy bar, most preferably via sissy bar clamp 40. Slide rods 30 and thus cross tube 16 are most preferably attached to saddle block 36 by threading threaded rod 34 through opening 38 of its respective saddle block 36 and tightening a nut and washer combination on a distal end of threaded rods 34. A bottom portion of an outside circumference of cross tube 16 is preferably cradled within an inside circumferential portion of saddle block 36. If a user wishes to temporarily remove armrests 12 from a motorcycle, he or she need only remove the nuts and washers from threaded rods 34. Saddle blocks 36 thus preferably remain attached to the sissy bar.

Cross tube 16 is optionally attachable to a variety of shapes and sizes of sissy bars for different makes and models of motorcycles by a variety of attachment sets, which can include a variety of differently-configured saddle blocks 36 and clamps 40 as illustrated in FIGS. 8A-D. As best illustrated in FIG. 7B, openings 39 in saddle block 36, through which fasteners pass, which fasteners are preferably used to clamp saddle block to a sissy bar, are optionally oblong such that variances in different widths of sissy bars can be accommodated.

As illustrated in FIG. 8, depending upon the shape and size of the particular sissy bar to be accommodated, clamp 40, attachable to saddle block 36, can be provided in multiple different clamping shapes, sizes, and configurations in order to provide the ability to clamp saddle block 36 to a given sissy bar. Of course, desirable results can also be obtained by any other manner of fixedly securing saddle block 36 to a sissy bar, including but not limited to directly bolting through the sissy bar or welding or brazing saddle block 36 to the sissy bar. Multiple other embodiments of clamp 40 are illustrated in FIGS. 9A-11C.

Figure 12:
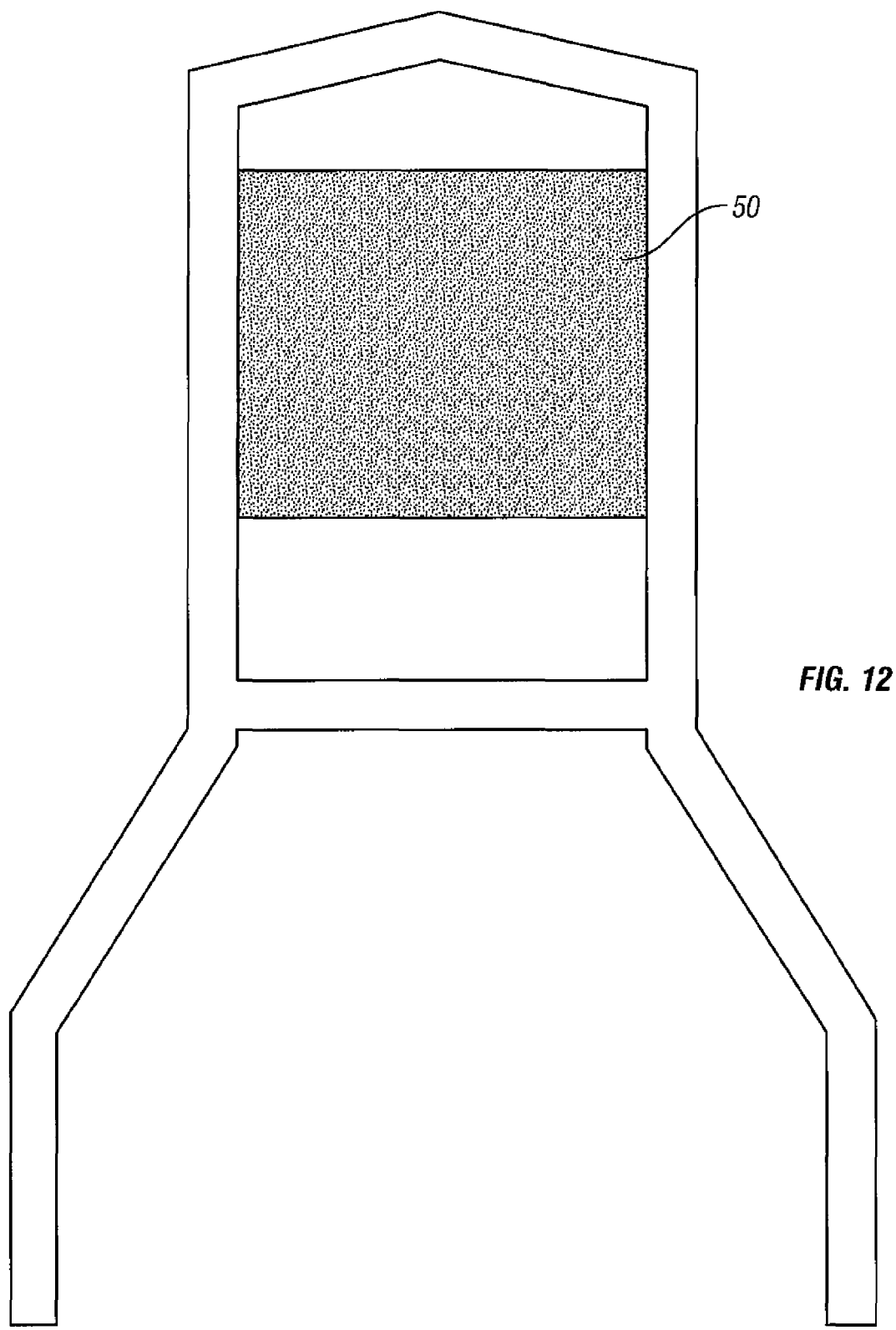
FIG. 12 illustrates a decorative shield plate which can be attached to a back of a sissy bar.

FIG. 12 illustrates an embodiment of the present invention wherein shield 50 is optionally provided which is a decorative metal plate attached between the left and right uprights of the sissy bar, which can be used for a motorcycle logo or other medallion.

Figure 13A:
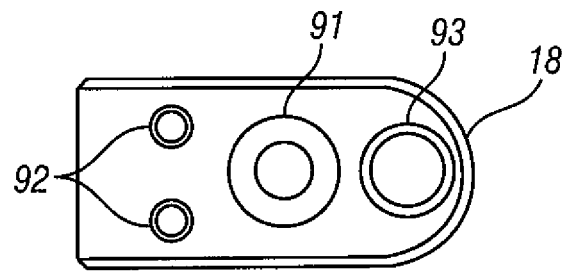
FIGS. 13A-C are drawings which respectively illustrate top, side, and bottom view of a pivot carrier.
Figure 13B:
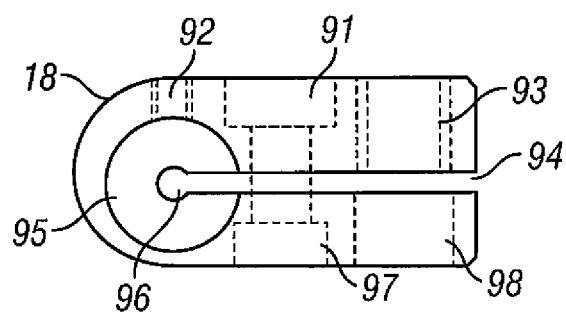
Figure 13C:
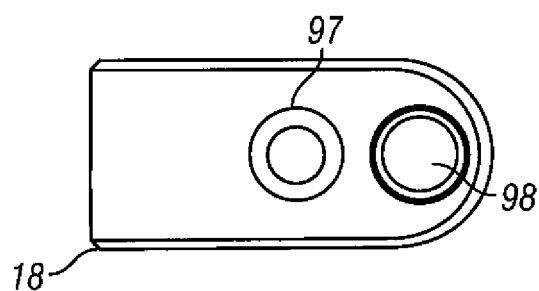

FIGS. 13A-C respectively illustrate top, side, and bottom views of a left-hand unit of pivot carrier 18. Of course, the right-hand unit is a mirror image of the illustrated pivot carrier 18. As illustrated in the figures, pivot carrier 18 preferably comprises opening 91, which preferably comprises dimensions suitable to accommodate pivot shaft 20 (see FIG. 3), which is received within pivot block 100 (see FIG. 14). The bottom of bore 93 is preferably drilled as a clearance hole for a threaded spring ball plunger. The top of bore 93 most preferably comprises threads to match the spring ball plunger. Ball 22 (see FIG. 3), which is preferably a metal ball, more preferably a steel ball, and most preferably a stainless steel ball, fits into either of detent 90 or 90' of pivot block 100. When ball 22 is located within detent 90, armrest 12 is preferably disposed in a rearward-facing position. When ball 22 is located with detent 90', armrest 12 is preferably disposed in a forward-facing position. In a preferred embodiment, a force of about 50 pounds is applied to ball 22 by the spring ball plunger. Bores 92 are preferably provided to accommodate cone-point set screws 24, such as illustrated in FIG. 3. Set screws 24 are preferably screwed in to create a frictional interface with grooves 20 of cross tube 16, thereby preventing pivot carrier 18 from slipping off of an end of cross tube 16. FIG. 13B illustrates a right side view of left-hand part of pivot carrier 18 comprising bore 95 that preferably presents a sliding fit for cross tube 16. Center hole 96 and space 94 preferably provide a clamping mechanism such that pivot carrier 18 can attach solidly to cross tube 16 by tightening a clamping screw (not shown) which is preferably threaded into the bottom of pivot shaft 20. FIG. 13C illustrates a bottom view of pivot carrier 18 wherein counterbore 97 is provided for a socket head cap screw.

Figure 14:
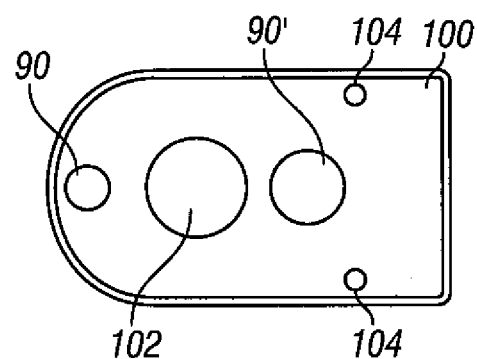
FIG. 14 is a drawing illustrating a bottom view of a pivot block according to an embodiment of the present invention.

FIG. 14 illustrates a bottom view of pivot block 100 which preferably rotates about pivot shaft 101 (see FIG. 19) having ends which respectively reside within opening 102 of pivot block 100 and opening 91 of pivot carrier 18, thereby rotationally coupling pivot block 100 to pivot carrier 18. In one embodiment, pivot block 100 is preferably fitted with one or more limit pins 104 or another type of stop mechanism which prevents over-rotation of armrests 12 beyond a predetermined desirable amount. In addition to detent 90 as illustrated, multiple other detents can also optionally be provided at desirable places about the rotational path of pivot carrier 18 with respect to pivot block 100 to provide one or more sticking points for armrest 12 as is it is rotated outward and back inward.

Figure 15A:
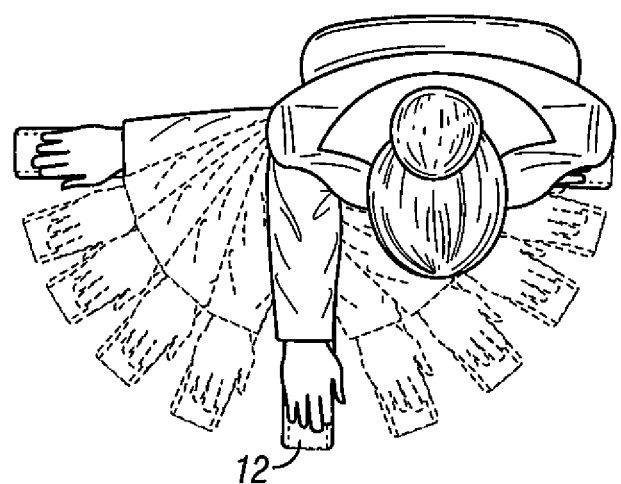
FIGS. 15A and B are drawings which illustrates the side-to-side swinging motion of armrests according to an embodiment of the present invention.
Figure 15B:
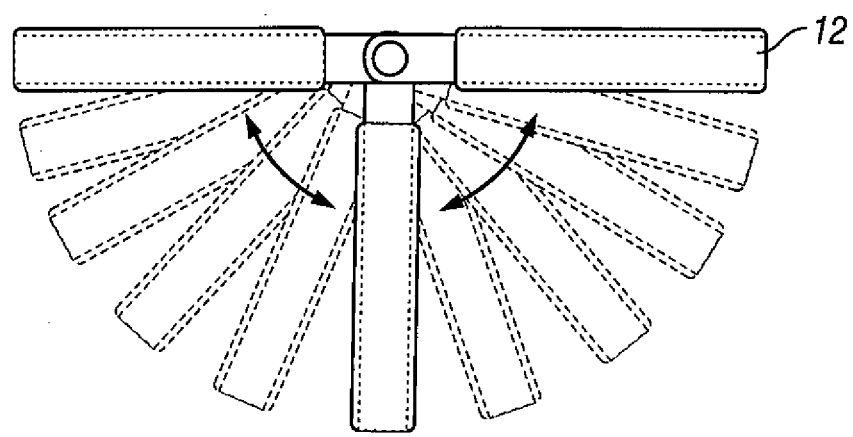
Figure 16A:
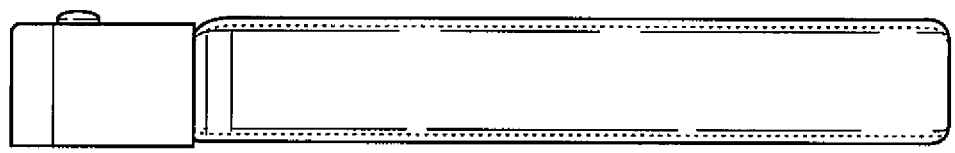
FIGS. 16A-E are a plurality drawings which illustrate multiple armrest padding options.
Figure 16B:
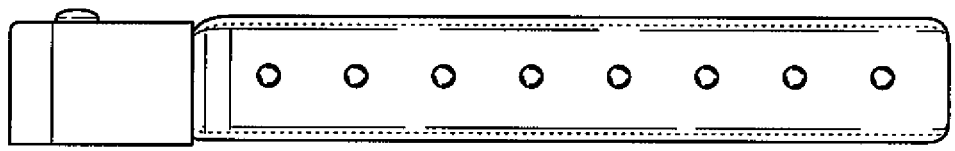
Figure 16C:
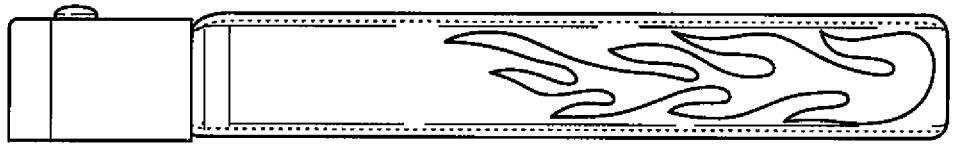
Figure 16D:
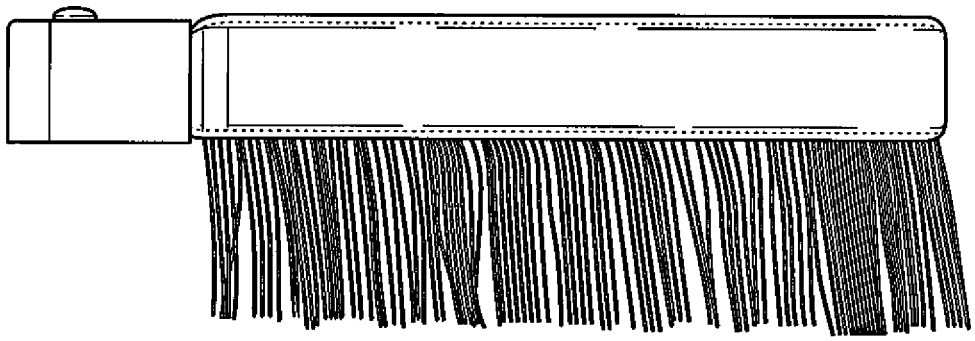
Figure 16E:
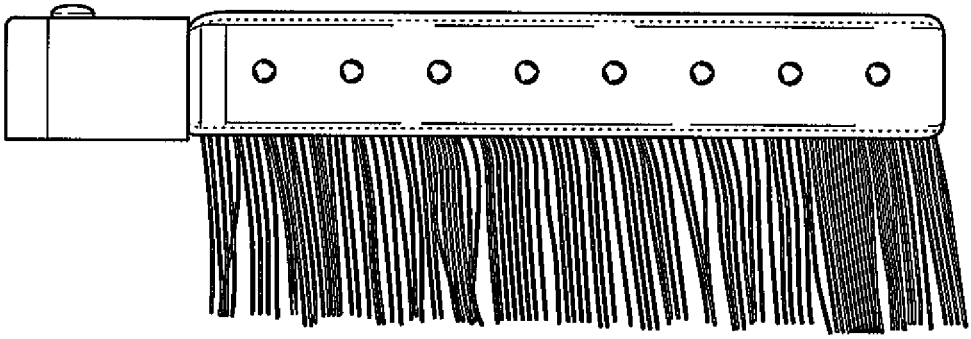
Figure 17A:
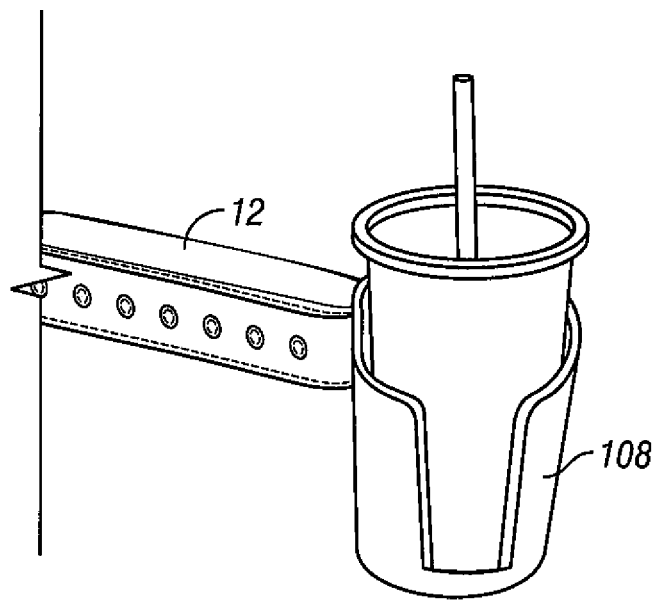
FIGS. 17A-D illustrate a cup-holder attachment.
Figure 17B:
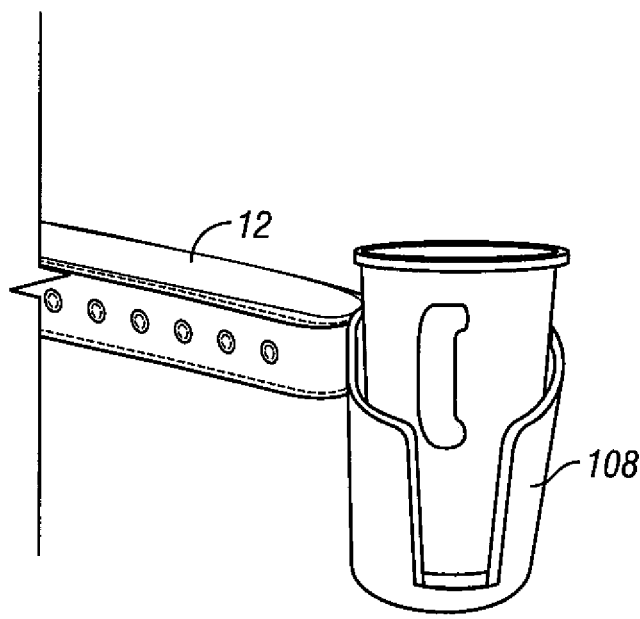
Figure 17C:
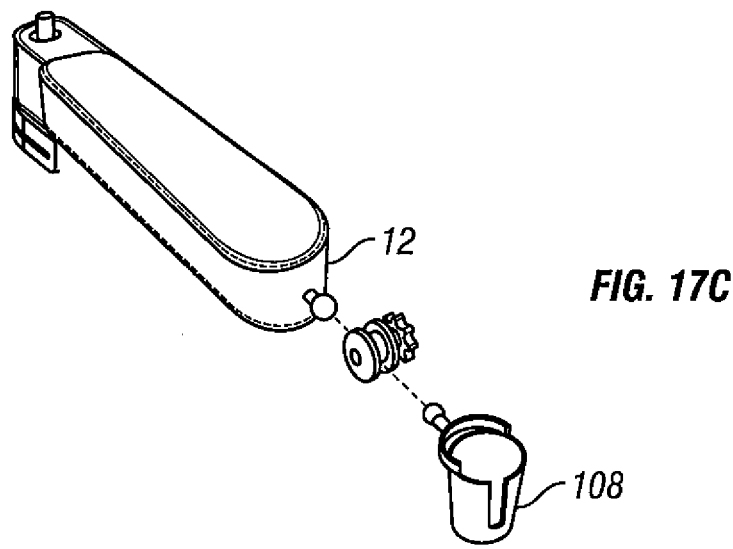
Figure 17D:
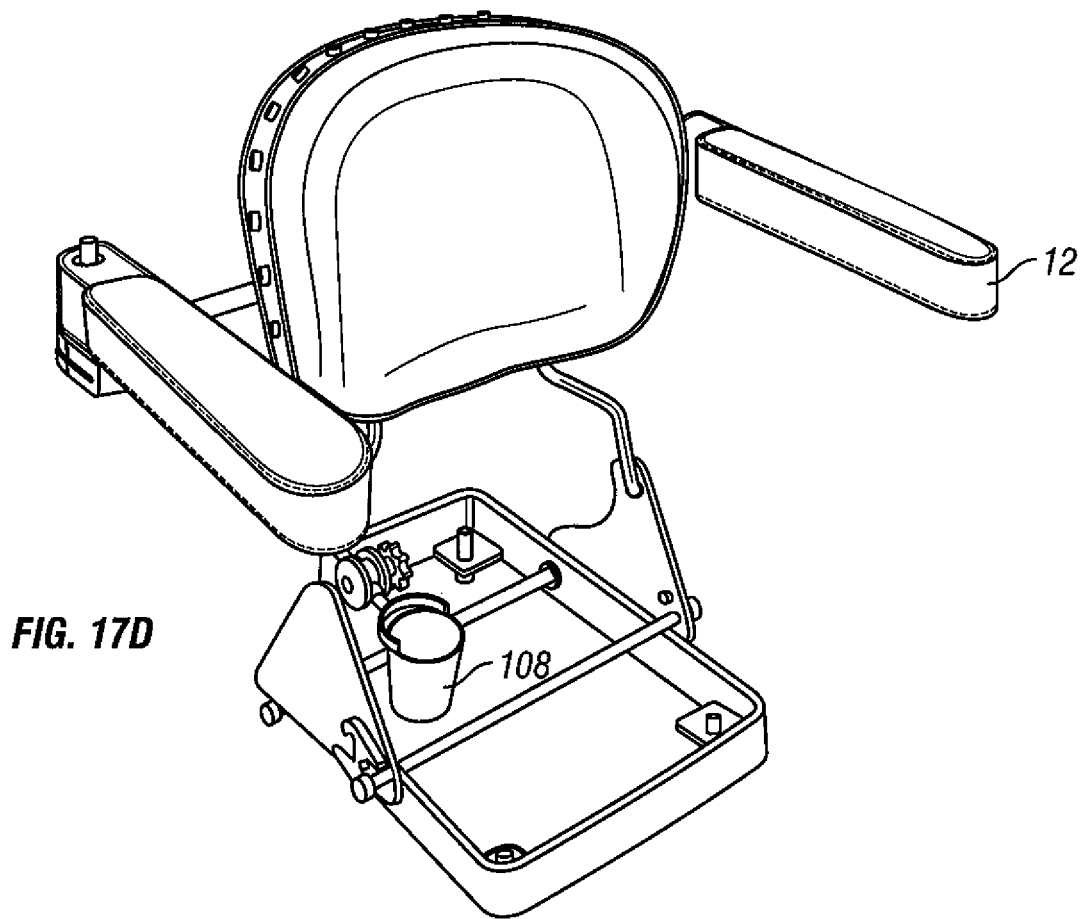

FIGS. 15A and 15B illustrates the side-to-side swinging motion of armrest 12 with and without a passenger according to an embodiment of the present invention. In one embodiment, armrest 12 can optionally swing all the way in such that it is touching backrest 14, or if backrest 14 is not provided, then it can optionally swing all the way in such that it is touching a front of a sissy bar. FIGS. 16A-E illustrate a plurality of optional armrest pad options which permit them to be tailored to any motorcycle design. Other design elements can optionally be incorporated into one or more of armrests 12, including but not limited to conchos, coins, other metallic, plastic, and/or fabric objects combinations thereof and the like.

FIGS. 17A-D illustrate cup holder 108 which can optionally be attached to armrest 12. This is most preferably achieved with a ball-and-socket connection, thereby providing a placement and orientation adjustment mechanism for cup holder 108. Any other type of attachment mechanism and/or method capable of supporting the weight of cup holder 108 and a beverage contained therein can optionally be used and will provide desirable results. In one embodiment, an adaptor can be disposed at least partially over an end portion of armrest 12 to accommodate a ball-and-socket unit, but in another embodiment cup holder 108 can be attached to a center support structure of the armrest.

Figure 18:
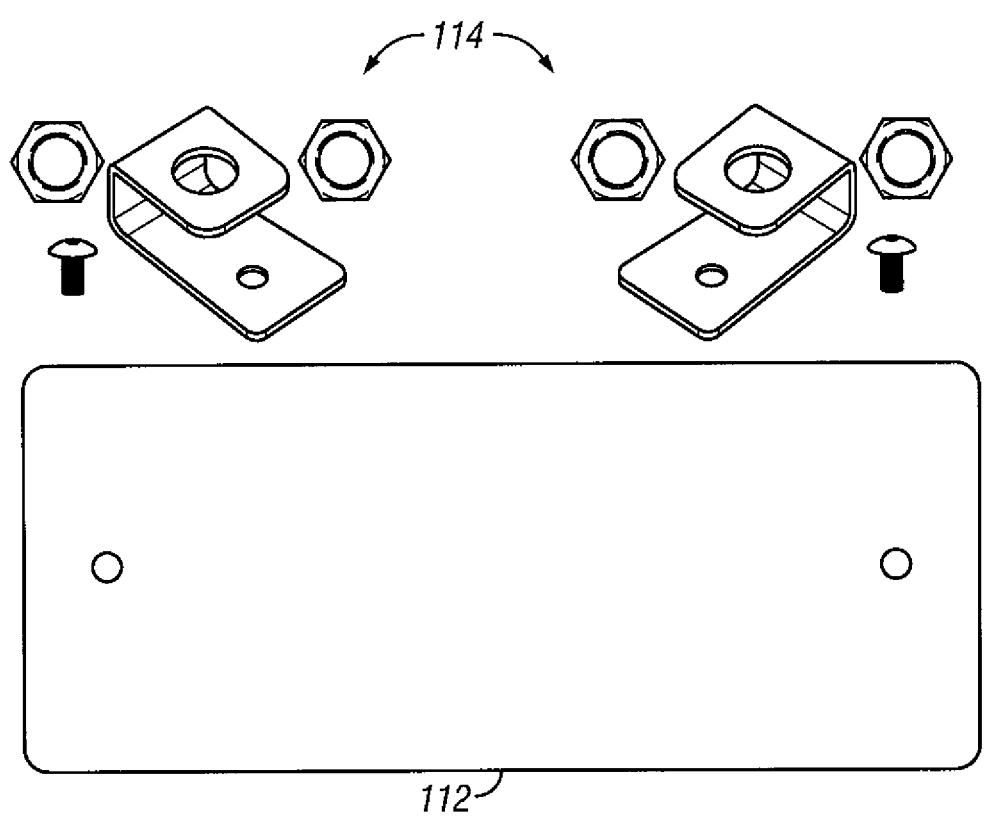
FIG. 18 illustrates a personalized name plate bracket.

FIG. 18 illustrates personalized name plate 112 and brackets 114 which attach plate 112 to saddle block 36 of the present invention. An embodiment of the present invention also comprises an illuminated license plate holder which incorporates a plate bracket set for attachment.

Figure 19:
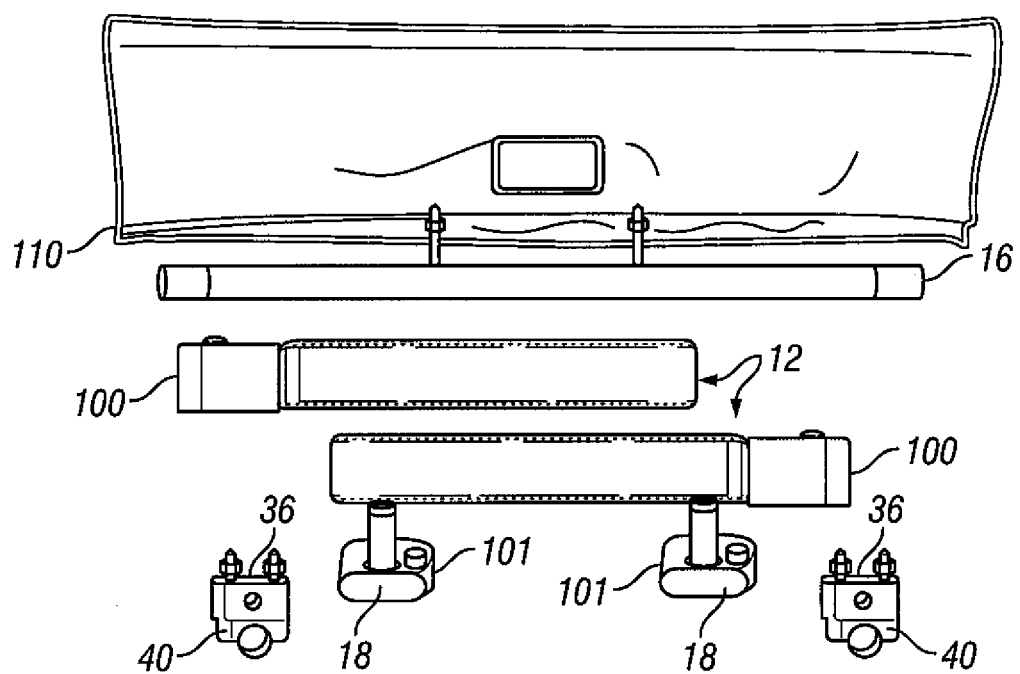
FIGS. 19-23 illustrate multiple kit embodiments of the present invention.
Figure 20:
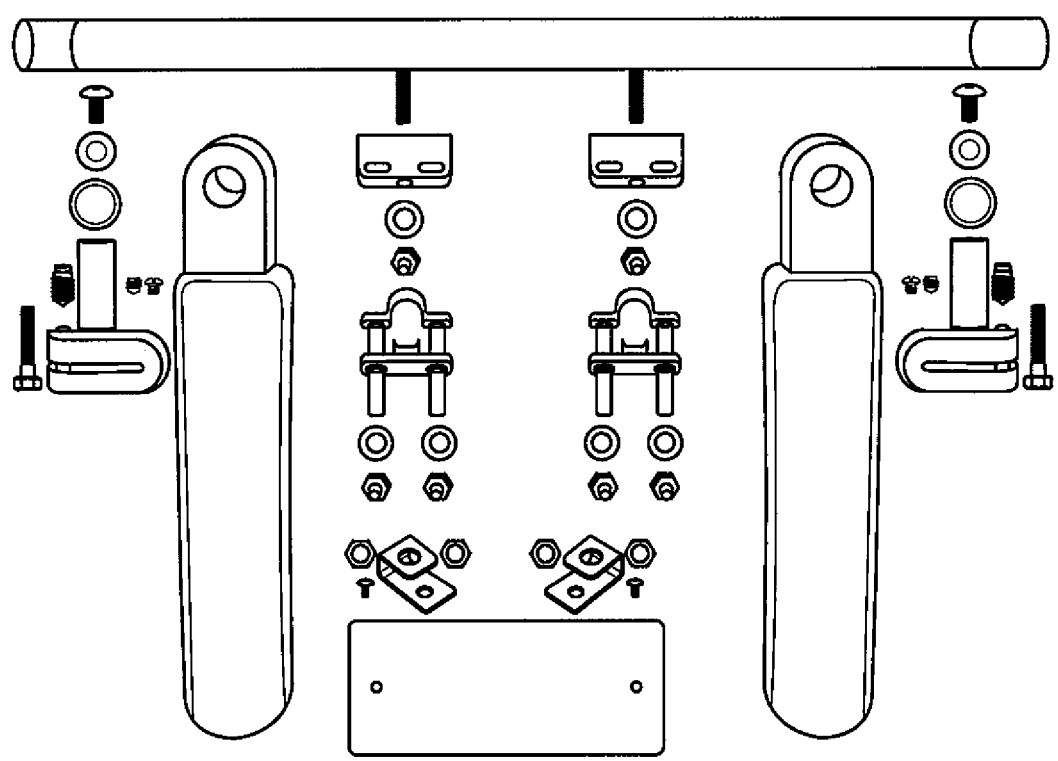
Figure 21:
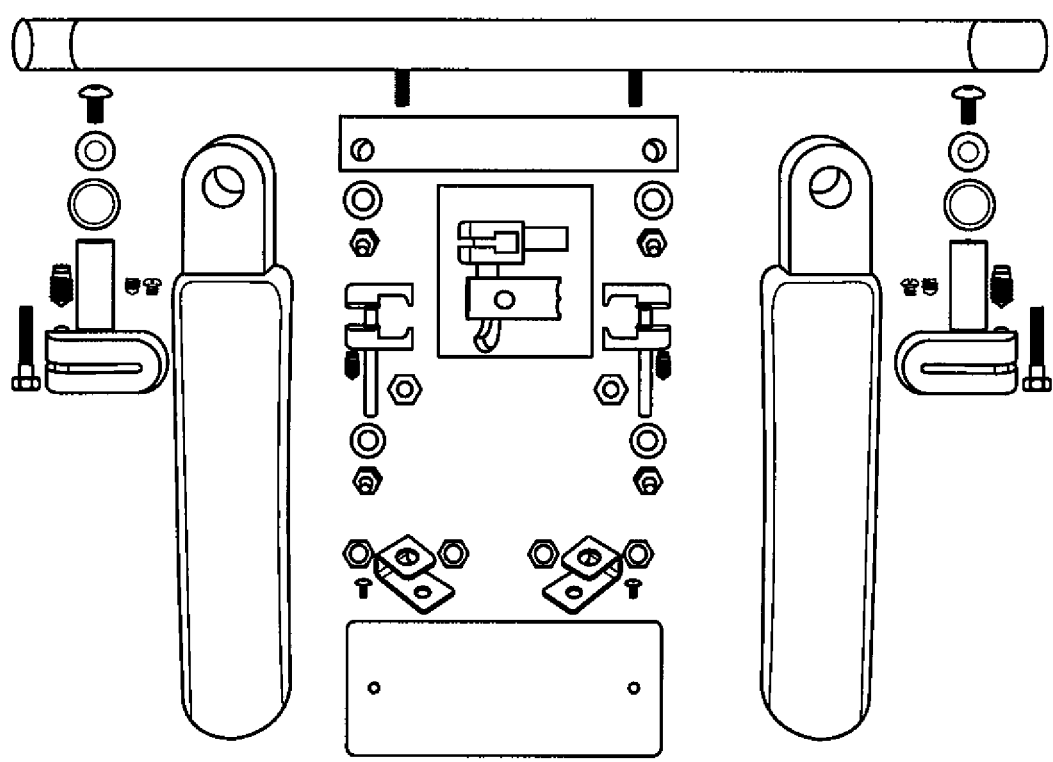
Figure 22:
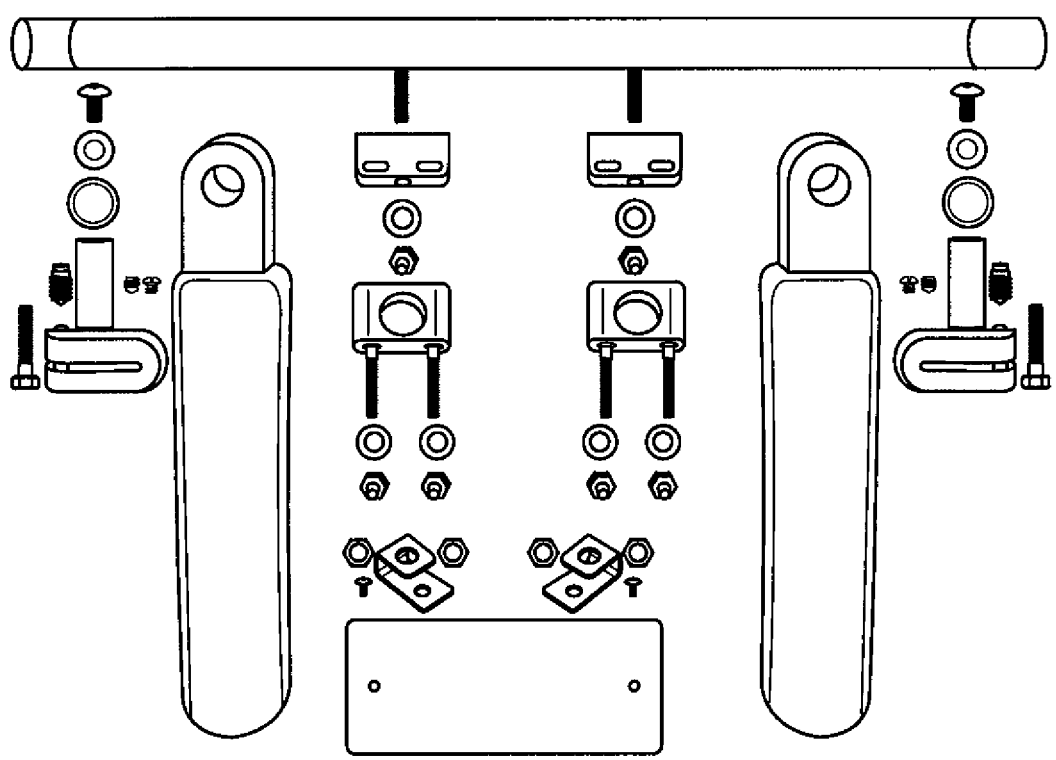
Figure 23:
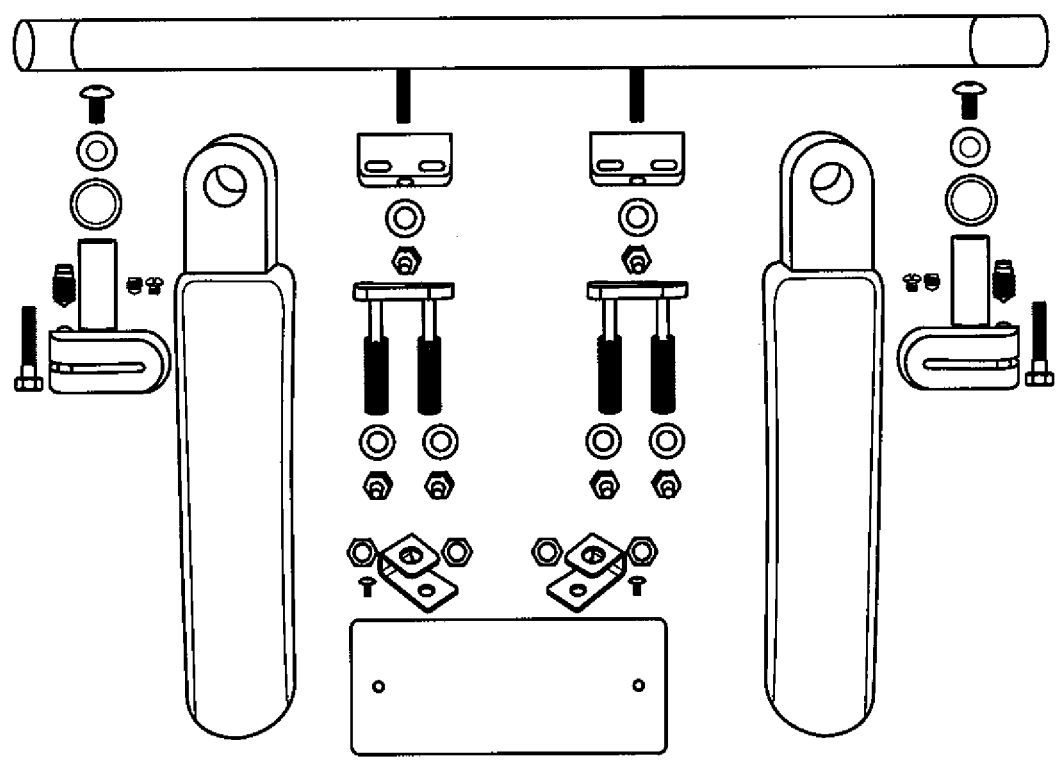
Figure 24D:
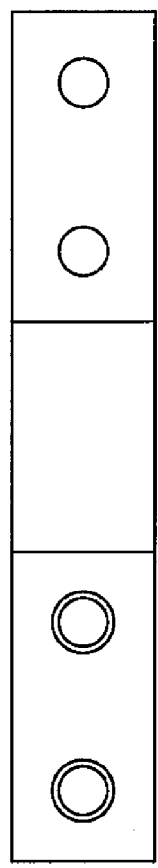
Figure 24D:
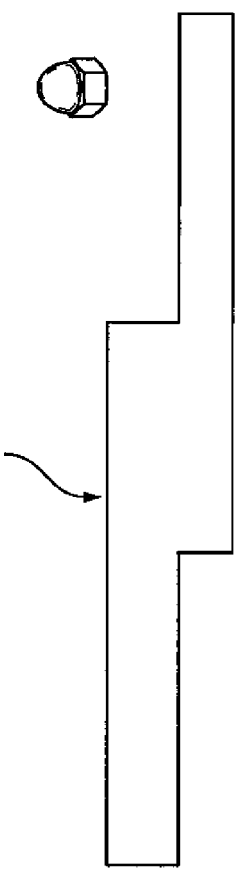
Figure 24D:
Figure 24D:
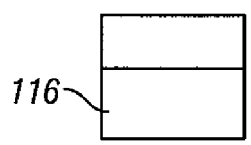
Figure 25:
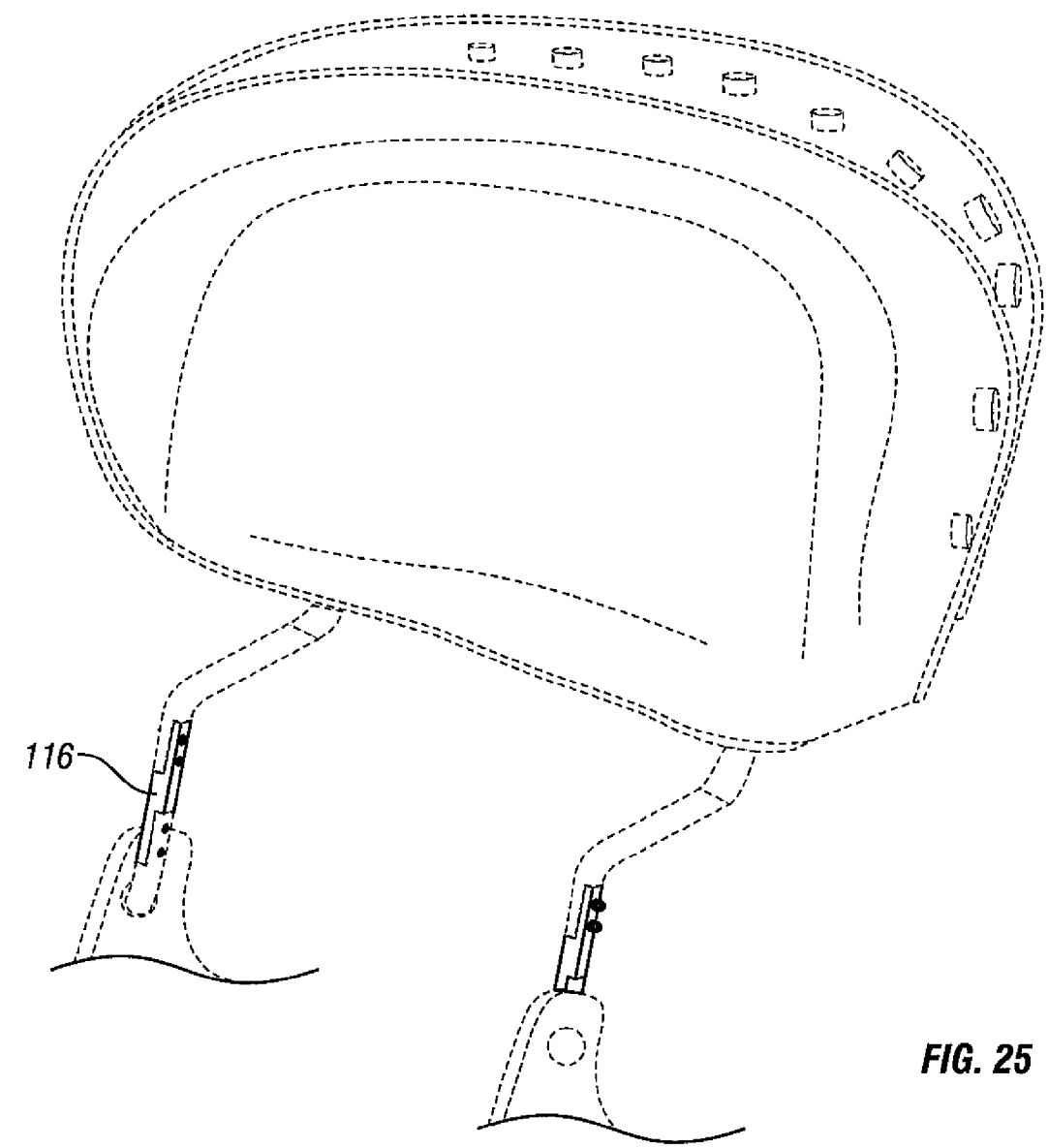
FIG. 25 is a perspective view drawing illustrating a sissy bar extension of an embodiment of the present invention attached to a sissy bar.

FIG. 19 illustrates a kit which can be provided such that all components necessary to practice an embodiment of the present invention can be provided to a user in a single kit. The kit can optionally include storage pouch 110 for storage during winter months or when the present invention is otherwise not being used. Depending upon a particular sissy bar to be accommodated, multiple other kits can also optionally be provided as illustrated in FIGS. 20-23. Optionally, in some embodiments of the present invention the kits and also include a backrest which can be a padded backrest. Multiple other attachment clamps and mounting mechanisms can be provided, which provide a user with the ability to mount the armrest assembly of an embodiment of the present invention to sissy bars of various sizes and dimensions as are typically encountered.

FIGS. 24 A-D and 25 illustrate sissy bar extension bracket 116, which can optionally be used to extend an otherwise short sissy bar. Sissy bar extension 116 permits a user to extend a sissy bar which is too short to comfortably accommodate armrest assembly 10 (for example if the sissy bar is only a few inches high and armrest assembly 10 were attached thereto, armrests 12 would be beside the users legs) to be extended such that it not only comfortably accommodates armrest assembly 10, but that the sissy bar is also extended to a height which provides a comfortable backrest for a passenger of a motorcycle.

Other embodiments of the present invention may further comprise an I-Phone or MP3 holder, water bottle sling, accessory pouch, tooled leather arm pads, cargo net for luggage carrier position, and a baggage carrier, which can be used by removing the armrests and using a bungee cord between two pivot posts. In one embodiment, the armrests do not pivot up and down. Accordingly, in one embodiment, the armrests do not pivot in a substantially vertical or vertical plane when attached to a motorcycle in its normal upright driving orientation. In one embodiment, at least one of the armrests can pivot in a substantially horizontal or horizontal plane. In one embodiment, both of the armrests can rotate independently of one another. In yet another embodiment, the armrest may pivot outwardly and upwardly at an angle which is not horizontal or vertical. Optionally, only one armrest can be configured to rotate while the other armrest remains stationary. In one embodiment, the armrests can be pivoted to face a reward-direction by rotating them out to a side and around to a rearward position. In one embodiment the armrests cannot be rotated to face in a reward-facing direction by rotating them up and around. In one embodiment, the top of the armrests in the forward-facing position form the top of the rack when rotated to a rearward-facing position. In one embodiment, the bottom of the armrests, when in a forward-facing position, do not form the top of the rack when rotated into a rearward-facing position.

The term "cycle" as used herein means a vehicle including but not limited to a motorcycle, bicycle, tricycle, ATV, jet ski, etc. The term "cycle" specifically excludes chairs, wheelchairs, mobile wheelchairs and other devices for assisting disabled persons.

The term "sissy bar" as used herein means a bar or attachment mechanism for the armrest(s) to attach to. Although the term "sissy bar" is normally associated with motorcycles, this term is used herein to describe any bar or attachment for any cycle.

Although the invention has been described in detail with particular reference to these preferred embodiments, and primarily address a motorcycle, other embodiments for other motorcycles and for other cycles can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:
1. An apparatus comprising:
    a cycle attachment mechanism comprising a sissy bar clamp and a cross tube;
    at least one slide rod, said slide rod disposed within and slidable within said cross tube;
    a first armrest, said first armrest pivotable upwardly and outwardly to a first side;
    a second armrest, said second armrest pivotable upwardly and outwardly to an opposing side, wherein the upwardly pivotability of at least one of said armrests is accomplished via a first pivot carrier which pivots about said cross tube; and said first and said second armrests pivotable outwardly to said first and said opposing sides respectively and to a rearward-facing configuration forming a luggage rack behind a seat of a cycle.

2. The apparatus of claim 1 wherein said armrests are pivotable in a substantially horizontal plane.

3. The apparatus of claim 1 wherein said first and said second armrests pivot independently of one another.

4. The apparatus of claim 1 wherein said sissy bar clamp comprises a saddle block.

5. The apparatus of claim 1 wherein said first pivot carrier comprises a pivot shaft.

6. The apparatus of claim 5 further wherein said cross tube further comprises slots.

7. The apparatus of claim 6 wherein said first pivot carrier is disposed near a first end of said cross tube.

8. The apparatus of claim 6 further comprising a second pivot carrier.

9. The apparatus of claim 8 wherein said first pivot carrier is disposed near a first end of said cross tube and said second pivot carrier is disposed near a second end of said cross tube.

10. The apparatus of claim 9 further comprising an apparatus which urges at least one of said armrests to remain in a predetermined orientation.

11. The apparatus of claim 1 further comprising an apparatus which urges at least one of said armrests to remain in a predetermined orientation.

12. The apparatus of claim 1 further comprising a cup holder disposed on at least one of said armrests.

13. The apparatus of claim 12 wherein said cup holder is moveably positionable with respect to said armrest on which it is attached.

14. The apparatus of claim 1 further comprising a sissy bar extension.

15. The apparatus of claim 1 attachable to a motorcycle.

16. An apparatus comprising:

a cycle attachment mechanism comprising a sissy bar clamp and a cross tube, said cross tube comprising one or more slots;

a first armrest, said first armrest pivotable upwardly and outwardly to a first side;

a second armrest, said second armrest pivotable upwardly and outwardly to an opposing side, wherein the upwardly pivotability of at least one of said armrests is accomplished via a first pivot carrier which pivots about said cross tube; and said first and said second armrests pivotable outwardly to said first and said opposing sides respectively and to a rearward-facing configuration forming a luggage rack behind a seat of a cycle.

\* \* \* \* \*